United States Patent
Smith et al.

(10) Patent No.: US 12,010,559 B2
(45) Date of Patent: **\*Jun. 11, 2024**

(54) IMPLEMENTING SERVICE LEVEL AGREEMENTS IN AN IDENTITY FEDERATION

(71) Applicant: Cisco Technology, Inc., San Jose, CA (US)

(72) Inventors: Malcolm M. Smith, Richardson, TX (US); Jerome Henry, Pittsboro, NC (US); Mark Grayson, Maidenhead (GB); Robert E. Barton, Richmond (CA); Bart A. Brinckman, Nevele (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,549

(22) Filed: Mar. 21, 2023

(65) Prior Publication Data

US 2023/0300680 A1 Sep. 21, 2023

Related U.S. Application Data

(63) Continuation of application No. 17/148,146, filed on Jan. 13, 2021, now Pat. No. 11,627,498.

(60) Provisional application No. 63/107,130, filed on Oct. 29, 2020.

(51) Int. Cl.
*H04L 9/40* (2022.01)
*H04W 8/22* (2009.01)
*H04W 12/06* (2021.01)
*H04W 12/69* (2021.01)
*H04W 28/24* (2009.01)
*H04W 84/12* (2009.01)

(52) U.S. Cl.
CPC .............. *H04W 28/24* (2013.01); *H04W 8/22* (2013.01); *H04W 12/06* (2013.01); *H04W 12/69* (2021.01); *H04W 84/12* (2013.01)

(58) Field of Classification Search
CPC ....... H04W 28/24; H04W 8/22; H04W 12/06; H04W 12/69; H04W 84/12; H04W 8/12; H04W 48/18; H04L 63/0815
See application file for complete search history.

(56) References Cited

U.S. PATENT DOCUMENTS 11,627,498 B2 * 4/2023 Smith ................. H04W 8/22
370/338
2007/0041384 A1 * 2/2007 Das ................... H04Q 11/0067
370/395.4

\* cited by examiner

*Primary Examiner* — Joseph E Dean, Jr.
(74) *Attorney, Agent, or Firm* — Patterson + Sheridan, LLP

(57) ABSTRACT

Techniques for dynamically negotiating a service legal agreement (SLA) between a roaming device and a visited network (VN) in an identity federation. An identity profile provided to a user device by an identity provider (IDP) is accessed by the user device. The identity profile includes a first SLA criteria. An advertisement from the VN indicating one or more SLAs supported by the VN is received at the user device. The advertisement is received before the user device has associated with the VN. The IDP and the VN are part of a same identity federation. It is determined that the SLA supported by the VN satisfies the first SLA criteria. Upon that determination, an acceptance is transmitted by the user device to the VN, and the user device is associated with the VN.

20 Claims, 5 Drawing Sheets

IMPLEMENTING SERVICE LEVEL AGREEMENTS IN AN IDENTITY FEDERATION

CROSS-REFERENCE TO RELATED APPLICATIONS

This application is a continuation of co-pending U.S. patent application Ser. No. 17/148,146, filed Jan. 13, 2021, which claims benefit of U.S. provisional patent application Ser. No. 63/107,130, filed Oct. 29, 2020. The aforementioned related patent application is herein incorporated by reference in its entirety.

TECHNICAL FIELD

Embodiments presented in this disclosure generally relate to dynamically agreeing to a service level agreement (SLA) for a roaming device in an identity federation.

BACKGROUND mom Open Roaming (or more generally, an identity federation) permits roaming devices to use a single ID to authenticate and join visited networks (VNs) (also referred to as access networks) that are operated by different entities. These federations include identity providers (IDP) that establish relationship of trusts with the VNs. When a user device (e.g., a cell phone, laptop, tablet, etc.) roams to a VN, the VN can leverage its relationship of trust with the IDP to authenticate the device.

For example, it is often cheaper for a cellular provider to switch user devices from its cellular network to a Wi-Fi network (e.g., a VN) that belongs to the same identity federation, even if the cellular provider has to pay the Wi-Fi network for the bandwidth used by the user devices. However, the cellular provider (e.g., an IDP) may want to ensure the user receives a minimum level of service (e.g., a minimum bandwidth or maximum latency) when connected to the VN. This requires the cellular provider to negotiate with the Wi-Fi network providers in the identity federation to guarantee a certain SLA for its customers. It is difficult, if not impossible, to negotiate with each VN in an identity federation, considering an identity federation can have hundreds of different VNs, with VNs being added constantly.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method that includes accessing, by a user device, an identity profile provided to the user device by an identity provider (IDP). The identity profile includes a first service level agreement (SLA) criteria. The method also includes receiving, at the user device, an advertisement from a visited network (VN) indicating one or more SLAs supported by the VN. The advertisement is received before the user device has associated with the VN. The IDP and the VN are part of a same identity federation. The method also includes, upon determining the SLA supported by the VN satisfies the first SLA criteria, transmitting, by the user device, an acceptance to the VN and associating the user device with the VN.

Example Embodiments

Embodiments herein describe techniques for dynamically negotiating an SLA between a roaming device and a VN in an identity federation. Instead of an IDP having to individually negotiate with each VN to decide on an SLA before a user device roams between the VNs, in the embodiments described below, the parties can dynamically negotiate the SLA after the user device has detected the VN (but before the device is permitted to attach or associate with the VN). In one embodiment, when a roaming user device comes within wireless range of a VN, the roaming device receives an advertisement from the VN that indicates the current SLA (or SLAs) offered by the VN. The roaming device can compare this offered SLA to a stored SLA in an identity profile the device received from the IDP. If the offered SLA matches (or exceeds) the requirements in the stored SLA, the device transmits an acceptance to the VN, which then permits the device to attach (assuming the device was properly authenticated by the IDP).

In another embodiment, rather than the roaming device accepting the SLA, when a roaming device attempts to connect to a VN, as part of the authentication process the VN and the IDP negotiate an SLA for the roaming device. In one example, the IDP transmits an offer SLA to the VN which then decides whether it can meet the SLA. If not, the VN rejects the offer. Alternatively, the VN may send a counteroffer to the IDP which can decide whether to accept the counteroffer, even though it is not ideal. Instead of making a decision, the IDP may push the terms of the counteroffer to the roaming device so the user can decide whether to accept the SLA. The user may instead want to try using a different IDP (which might get more favorable terms from the VN than the current IDP) or attempt to connect to a different VN that is also within wireless range to determine whether that VN offers a better SLA.

Figure 1:
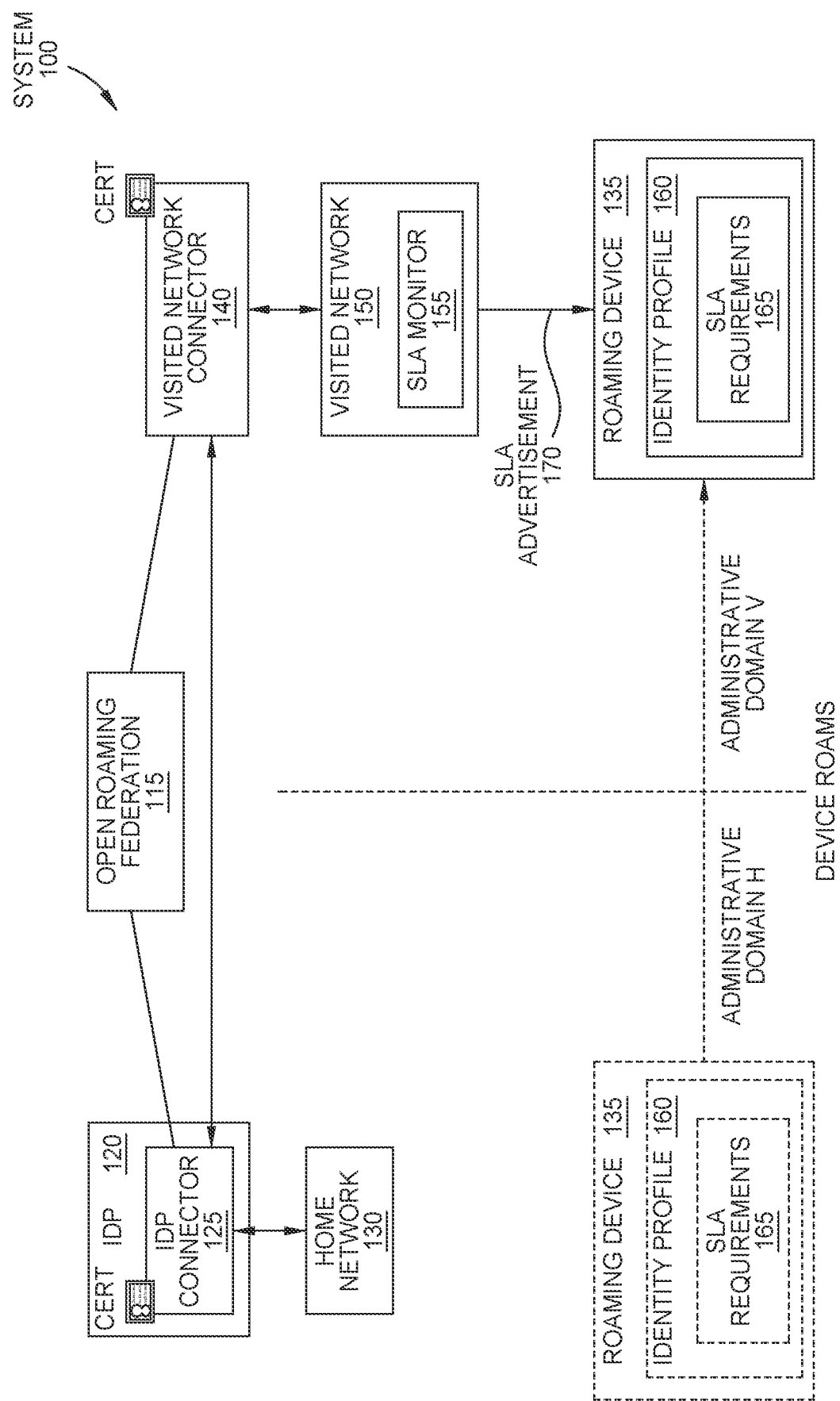
FIG. 1 illustrates a system for negotiating SLAs in an identity federation, according to one embodiment described herein.

FIG. 1 illustrates a system 100 for negotiating SLAs in an identity federation, according to one embodiment described herein. The system 100 includes an open roaming federation 115 that establishes trust between IDPs 120 and VNs 150 so that a roaming device 135 can be authenticated using credentials stored in the IDP 120. However, the embodiments herein can be applied to any identity federation that establishes trust between VNs and IDPs 120 so that roaming devices 135 can be identified. Generally, the open roaming federation 115 permits the VN 150 to authenticate the roaming device 135 so that the device 135 can attach to the VN 150. Moreover, the embodiments herein leverage the open roaming federation 115 to further enable a VN 150 to negotiate an SLA for the roaming device 135.

The roaming device 135 has a service agreement with at least one IDP 120. For example, the IDP 120 may be a cellular service provider, a cloud computing service, a social media platform, or the like, which permits the roaming device 135 to use a single ID to attach to the VNs 150 in the open roaming federation 115. As part of registering with an IDP 120, the user may be guaranteed a specific SLA when joining a VN 150. For example, the SLA may offer a minimum bandwidth, reduced latency, guaranteed high priority handling of specific applications (e.g., video conferencing applications, gaming applications, voice over IP (VoIP) applications, etc.), minimum performance during peak hours, and the like. The user may negotiate the SLA with the IDP 120, or may be assigned the SLA as a perk for registering with the IDP 120.

In FIG. 1, the roaming device 135 receives an identity profile 160 from the IDP 120. In addition to including credentials (e.g., a device ID) that the roaming device 135 can use so it can be authenticated when attaching to the VN 150, the identity profile 160 includes SLA requirements 165 that describe the SLA guaranteed to the device 135 when connecting to the VN 150. As discussed in more detail below, the roaming device 135 can compare the SLA requirements 165 to an SLA advertisement 170 provided by the VN 150. If the SLA advertised by the VN 150 does not satisfy the SLA requirements 165 in its identity profile 160, the roaming device 135 may decide not to attach to the VN 150.

In this example, the VN 150 includes an SLA monitor 155 which can evaluate performance metrics corresponding to the VN 150 to determine what types of SLAs it can support. For example, the SLA monitor 155 can determine a minimum bandwidth or maximum latency the VN 150 can provide to the roaming device 135. The SLA monitor 155 may also determine whether the VN 150 can prioritize certain applications or offer special treatment to the roaming device 135 during peak hours. Some of these metrics may vary depending on the current load on the VN and its status. For example, the VN 150 may be able to offer higher bandwidths and lower latency if the VN 150 currently has a lighter load (e.g., there are relatively few devices connected to the VN 15). However, other metrics may be static (and may be set by a system administrator) such as whether the VN 150 provides priority to certain applications, regardless of the current load on the VN 150. The SLA monitor 155 can then use the metrics to generate the SLA advertisement 170 for roaming devices 135.

Currently, Open Roaming uses Access Network Query Protocol (ANQP) to permit the roaming device 135 and the VN 150 to advertise services offered by access points (APs) in the VN 150. This protocol (as defined in IEEE 802.11u) can be modified to also include the SLA advertisement 170 that indicates the type (or types) of SLAs supported by the VN 150. However, the embodiments herein at not limited to leveraging ANQP (or a updated version of ANQP) to transmit the SLA advertisements 170, but this information can be transmitted using any communication protocol that facilitates communication between a VN 150 and roaming device 135 before the roaming device 135 has attached to the VN 150.

A VN Connector 140 coupled to the VN 150 interoperates with IDP Connectors 125 associated with a home network 130. These connectors 140, 125 provide means for dynamic discovery of peers, dynamic establishment of secure tunnels, and carrying identity and authentication packets requiring neither previous knowledge nor pre-established peering agreements between the IDPs 120 and the VNs 150. Each VN 150 may have associated one or more VN Connectors 140 (e.g., one for Wi-Fi, one for LoRa, one for PLTE, one for 5G, and so on, or they might all be integrated as a single entity).

The various components in FIG. 1 can be implemented using software, hardware, and combinations thereof. For example, the IDP 120 may include one or more computing systems with software that perform the functions described herein. The IDP connector 125 and the VN connector 140 can be software modules executing on respective computing systems. Further, the home network 130 and the VN network 150 can include multiple network devices such as APs, routers, switches, controllers, and the like. The roaming device 135 may be any wireless user device (e.g., tablet, smart phone, laptop, etc.) that includes a processor and memory.

Figure 2:
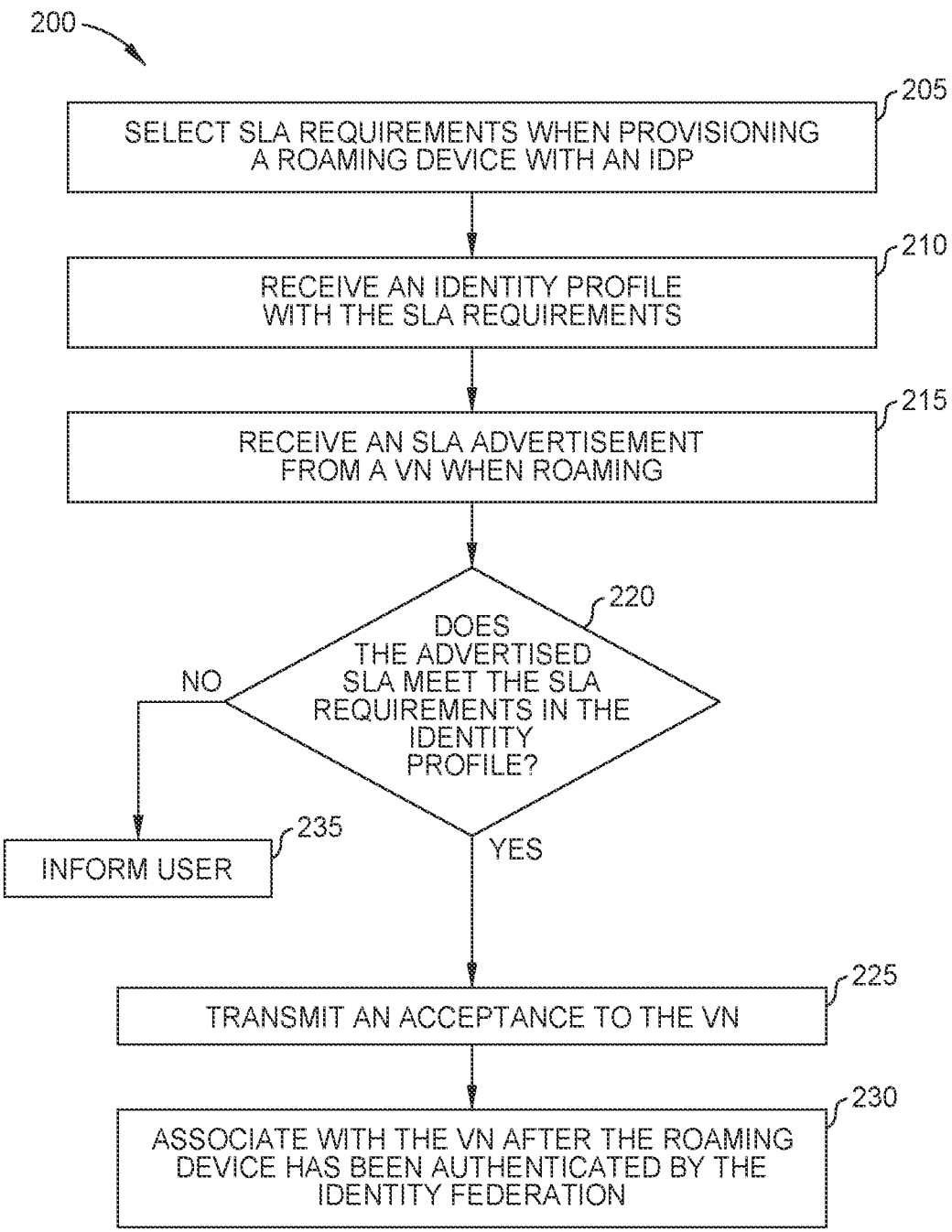
FIG. 2 is a flowchart for a user device to negotiate an SLA with a VN, according to one embodiment described herein.

FIG. 2 is a flowchart of a method 200 for a roaming device (e.g., a user device) to negotiate an SLA with a VN, according to one embodiment described herein. At block 205, the user selects SLA requirements when provisioning the roaming device with an IDP. That is, as part of provisioning (or registering) the roaming device with an IDP, the user may select an SLA, or one or more individual SLA criteria, it desires. In one embodiment, this selection includes selecting individual SLA parameters such as minimum bandwidth, upload speeds, download speeds, maximum latency, higher priority for gaming applications, and the like. In another embodiment, the IDP provides predefined SLAs from which the user selects one. For example, the IDP may offer gold, silver, bronze plans where the SLA requirements for the gold plan guarantee better quality of service than the silver plan, which in turn that offers a better quality of service than the bronze plan. In one embodiment, the user has a subscription to the IDP and pays for the guarantees provided in the SLA requirements. However, in another example, the IDP may offer the SLA as part of a free service.

When the roaming device is attached to a network operated by the IDP (e.g., the home network 130 in FIG. 1), the IDP can guarantee that the roaming device is provided a quality of service that satisfies the selected SLA requirements. However, the IDP (and the user) may still want those same SLA requirements when the roaming device roams to a different network not operated by the IDP (e.g., the VN network 150 in FIG. 1). The method 200 provides techniques for the user to receive the same SLA when connected to a VN that it would receive when connected to a home network.

At block 210, the roaming device receives an identity profile from the IDP that includes the SLA requirements selected at block 205. For example, the SLA requirements can list the various performance metrics a VN should provide to the roaming device. This identity profile can also include information needed by a VN in order to authenticate the roaming device in an identity federation such as Open Roaming.

At block 215, the roaming device receives an SLA advertisement from a VN when roaming. The SLA advertisement indicates the SLA the VN can offer the roaming device. For example, the SLA advertisement may indicate the minimum bandwidth guaranteed by the VN (e.g., minimum upload/download speeds), whether it offers higher priority to certain applications (e.g., teleconferencing, gaming, VoIP, etc.), and the like. In one embodiment, an SLA monitor in the VN generates the SLA advertisement by monitoring performance metrics of the VN such as the current network traffic, number of connected devices, throughput, and the like. As such, the SLA offered to the roaming device may vary depending on the current values of these performance metrics. Alternatively, the SLA offered by the VN may vary in response to the time of day. For example, the VN may advertise a lower performance SLA if the roaming device attempts to attach to the VN at peak hours versus non-peak hours. In yet another example, the SLA offered in the SLA advertisement is fixed and does not change unless by a system administrator.

In another embodiment, the VN may advertise an SLA after identifying the IDP corresponding to the roaming device. The VN may advertise a "default" SLA at block 215 to roaming devices but then, upon starting the lookup for the IDP, the VN can unicast back to the roaming device a customized (or adjusted SLA) in response to identifying the IDP for the roaming device. For example, the VN might advertise a better SLA for a roaming device depending on its IDP. The roaming device can then accept/reject the SLA as described below.

At block 220, the roaming device determines whether the advertised SLA meets the SLA requirements stored in its identity profile. For instance, if the SLA requirements in the identity profile specify a minimum bandwidth, the roaming device determines whether the advertised SLA guarantees a bandwidth at, or above, the minimum bandwidth.

In one embodiment, the roaming device ensures the advertised SLA meets all the stored SLA requirements in the identity profile. In another embodiment, the roaming device may prioritize the SLA requirements, where the advertised SLA only needs to meet the higher priority requirements, or the advertised SLA only needs to meet a threshold number of the SLA requirements (e.g., at least five of the SLA requirements). In another example, the advertised SLA may just have to be within a threshold of the SLA requirements. For example, the roaming device may determine the advertised SLA still meets the SLA requirements if the advertised minimum bandwidth is at least 95% of the minimum bandwidth stipulated in its identity profile. Put different, the advertised SLA may offer lesser performance than the stored SLA requirements, but so long as the advertised SLA is within a threshold of the stored SLA requirements, it still may be accepted.

Assuming the advertised SLA meets the SLA requirements, the method 200 proceeds to block 225 where the VN transmits an acceptance to the VN. At block 230, the roaming device can then associate with (or attach to) the VN after being authenticated by the identity federation. For example, before permitting the roaming device to attach to the VN, the VN uses identity information received from the roaming device to authenticate the roaming device with its corresponding IDP. That is, the VN can leverage a relationship of trust with the IDP to then authenticate the roaming device. Once authenticated, the VN permits the roaming device to attach and guarantees a level of service to the roaming device that satisfies the agreed upon SLA—i.e., the SLA the advertised by the VN at block 215. In this manner, the VN and roaming device can agree on an SLA dynamically before the roaming device attaches to the VN.

If the roaming device determines that the advertised SLA does not meet the stored SLA requirements, the method 200 instead proceeds to block 235 where the roaming device can inform the user. For example, the roaming device can display a graphical user interface (GUI) or output an audio message indicating the VN does not satisfy its agreed upon SLA with the IDP. The GUI or audio message can indicate the differences between the SLA advertised by the VN and the SLA requirements stored in the identity profile. The user may then have an option of nonetheless agreeing to the advertised SLA despite knowing it offers a lesser performance, attempting to connect to a different VN which might offer a better SLA, or using a different communication network (e.g., a cellular network rather than switching to a Wi-Fi network).

Figure 3:
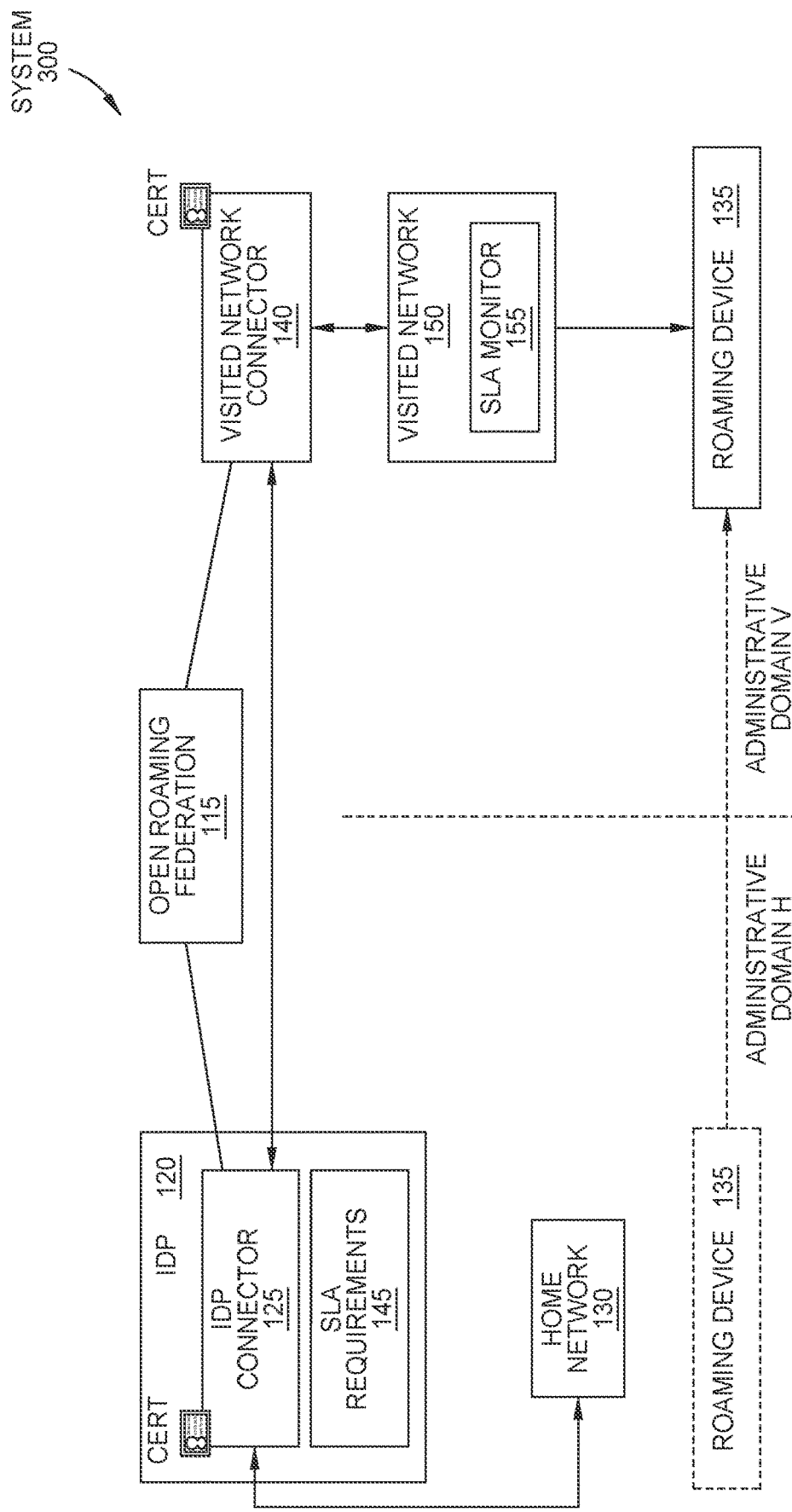
FIG. 3 illustrates a system for negotiating SLAs in an identity federation, according to one embodiment described herein.

FIG. 3 illustrates a system 300 for negotiating SLAs in an identity federation, according to one embodiment described herein. The system 300 has the same components as the system 100 in FIG. 1, such as the IDP 120, open roaming federation 115, VN connector 140, home network 130, VN 150, and roaming device 135. As such, these components are not described in detail here. Unlike in FIG. 1, the system 300 does not push the SLA requirements 145 to the roaming device 135. Here, instead of the roaming device 135 determining whether to accept or reject the SLA advertised by the VN 150, this negotiation occurs between the IDP 120 and the VN 150. As shown, the SLA requirements 145 are stored in the IDP 120. In one embodiment, the VN 150 and the IDP 125 use a RADIUS server or router to communicate, but this is an example of just one suitable means to communicate.

While the roaming device 135 does not include the SLA requirements 145, the roaming device 135 may still have an identity profile (which was provided by the IDP 120) that is shared with the VN 150 so that the VN 150 can authenticate the roaming device 135 as part of the open roaming federation 115.

Figure 4:
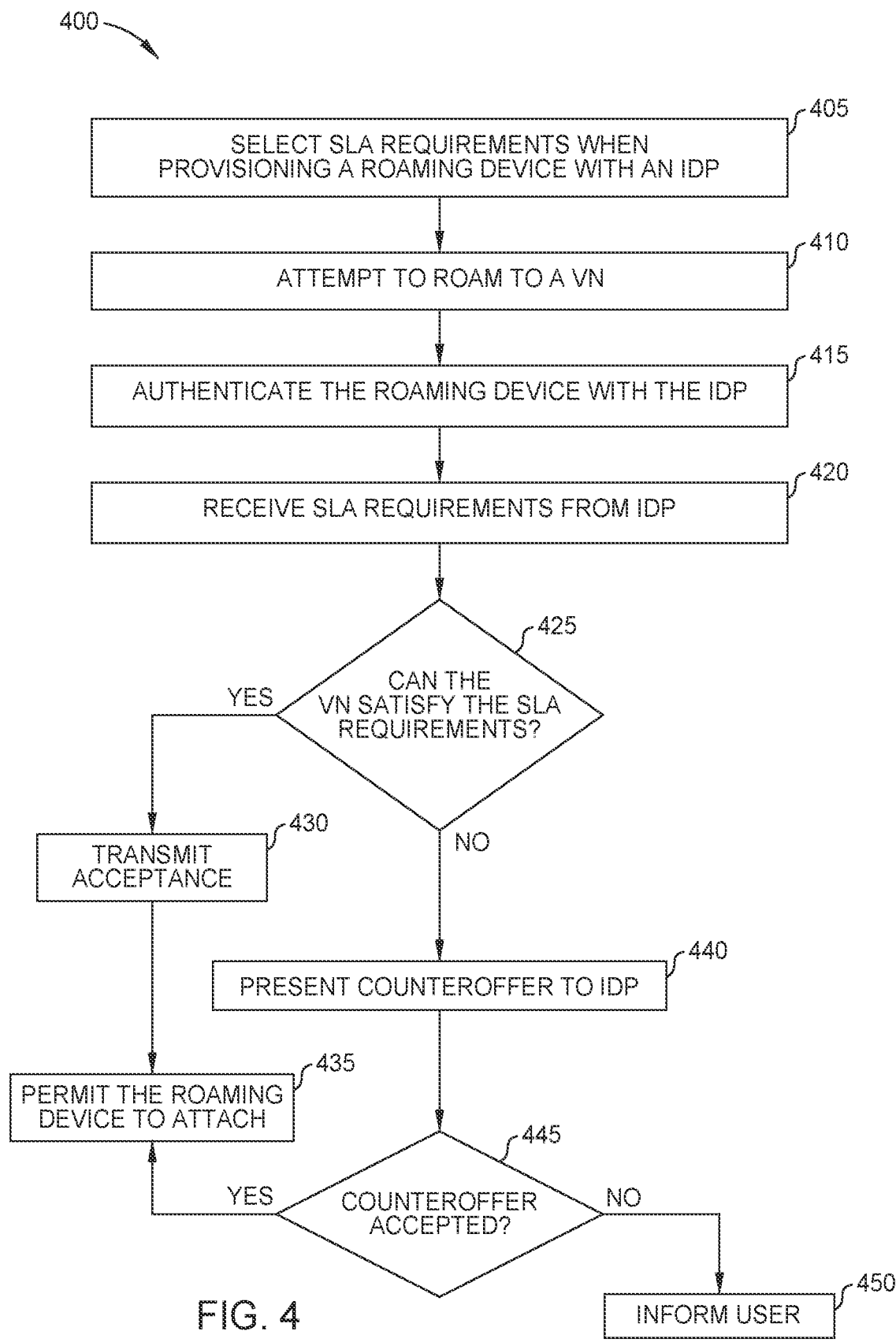
FIG. 4 is a flowchart for an IDP to negotiate an SLA with a VN, according to one embodiment described herein.

FIG. 4 is a flowchart of a method 400 where an IDP negotiates an SLA with a VN, according to one embodiment described herein. At block 405, the user selects SLA requirements when provisioning the roaming device with an IDP. That is, as part of provisioning (or registering) the roaming device with an IDP, the user may select an SLA it desires. Similar to block 205 in method 200, this selection can include selecting individual SLA parameters such as minimum bandwidth, upload speeds, download speeds, maximum latency, higher priority for gaming applications, and the like. In another embodiment, the IDP provides predefined SLAs from which the user selects one. For example, the IDP may offer gold, silver, bronze plans. Further, the user may pay the IDP, or its services may be free. In one embodiment, the method 400 provides techniques for the user to receive the same SLA when connected to a VN that it would receive when connected to a home network.

At block 410, a roaming device attempts to roam (or attach) to a VN. In one embodiment, the VN does not provide an SLA advertisement to the roaming device, unlike in the method 200. Alternatively, the VN may provide the SLA advertisement to the roaming device, but the roaming device may ignore the advertisement since it does not have the SLA requirements. In that case, the VN can support roaming devices that do store the SLA requirements stored in an identity profile as well as roaming devices that do not.

As part of roaming, the device transmits identity information—e.g., a device ID—to the VN using, e.g., ANQP. This identity information may be stored in the roaming devices identity profile.

At block 415, the VN authenticates the roaming device with the IDP using the device ID. This process may be different depending on the type of identity federation being implemented, but in any case, this process leverages the trust between the VN and the IDP to enable the VN to also trust the roaming device. In one embodiment, the VN uses the identity information provided by the roaming device to identity the IDP that issued the identity information. The VN can then send the device ID to the IDP so it can authenticate the roaming device.

At block 420, as part of the authentication process (or in parallel with the authentication process), the VN receives SLA requirements from the IDP. Put differently, before the IDP has authenticated the roaming device (or while it is authenticating the roaming device), the IDP can send the SLA requirements for the roaming device to the VN.

At block 425, the VN determines whether it can satisfy the SLA requirements. For example, the SLA monitor may evaluate the current performance metrics of the VN, or the VN may compare the SLA requirements to its own predefined (or fixed) SLA.

If the VN can satisfy the SLA requirements, then at block 430 the VN transmits an acceptance to the IDP. At block 435, assuming the roaming device was properly authenticated, the VN permits the roaming device to attach. The VN then provides a level of service to the roaming device that satisfies the SLA agreed upon with the IDP.

Returning to block 425, if the VN cannot satisfy the SLA requirements provided by the IDP, the method 400 proceeds to block 440 where the VN presents a counteroffer to the IDP. For example, the VN may be able to satisfy the minimum download speed but not the minimum upload speed requested by the IDP, or the VN may be able to meet the bandwidth requirements but does not offer a higher priority to teleconferencing applications. In the counteroffer, the VN may stipulate what SLA requirements it can meet and what requirements it cannot. For example, the counteroffer may indicate the VN can satisfy the minimum download speed but can guarantee a minimum upload speed that is only 90% of the upload speed requested by the IDP.

At block 445, the IDP determines whether to accept the counteroffer. For example, the IDP may prioritize its SLA requirements, such that if the VN is unable to satisfy a lower priority SLA requirements, the IDP may still accept the counteroffer. Or the IDP may still accept counteroffers where a performance metric in the SLA is within 10% of its requested value. If the IDP accepts the counteroffer, the method 400 proceeds to block 435 where the VN permits the roaming device to attach (again assuming it has been authenticated).

If the IDP does not accept the counteroffer, the method 400 proceeds to block 450 where the IDP informs the user via the roaming device. For example, the roaming device may display a GUI that indicates the requested SLA requirements and the SLA offered by the VN. The user can then make a choice to accept the SLA, in which case the IDP can relay the acceptance to the VN and the VN then permits the roaming device to attach.

Alternatively, the user may have registered with several different IDPs. For example, the user may wish to try to attach to the VN using a different IDP in hopes that IDP has a special relationship with the VN, and thus, may be able to negotiate a better SLA than the current IDP. For instance, the IDP currently negotiating with the VN may be a cellular provider for the roaming device, which may not have any special relationship with the VN. However, the user may also have an account with another IDP that provides cloud service. The user can use this identity profile to connect to the VN which then spurs the VN to negotiate with the new IDP. This IDP may have a special relationship with the VN, and thus, the VN may accept the SLA requested by the IDP.

In another example, the user may know there are several other VNs available (e.g., several wireless VNs in the same vicinity as the user). For example, the user may be in a mall where there are several Wi-Fi networks available that belong to the same identity federation. The user may decide to try a different VN to see if the IDP can negotiate a better SLA.

While the method 400 describes the IDP sending its SLA requirements to the VN in block 420, in other embodiments, the VN sends its SLA to the IDP instead. The IDP can then determine whether the offer SLA meets the SLA requirements, and if not, provide a counteroffer to the VN which it can either accept or reject as described in block 445.

Further, while the method 400 describes the VN (or IDP) providing a counteroffer, in another embodiment, the VN may simply reject or accept the SLA requirements. That is, the VN may not provide a counteroffer to the initial offer provided by the IDP. If the VN rejects the initial offer, the IDP can still inform the user so that the user can, if desired, instruct the IDP to authenticate the device so it can attach to the VN (but without an agreed upon SLA), or the user can try to use a different IDP to attach to the VN, or try a different VN (if available).

In one embodiment, if the VN accepts the offer (or the IDP accepts the counteroffer), the VN allocates network resources in the form of a slice to ensure the VN meets the SLA for the roaming device. Realization of the slice's SLA can be achieved by first grouping the users into a special group within a SSID. The roaming devices can be grouped into an IEEE 802.11ax association ID (AID) list. This AID list forms a group of devices to whom the SLA is applied in the SSID. However, this is just one example of how the VN can provide the agreed upon SLA to the roaming device.

Further, servicing of the SSID may use the following techniques: a prioritized scheduling mechanism assigned to wireless resources, including rescheduling resource units (RUs) to the roaming device, ensuring quality of service (QoS) policies are applied to qualified clients in the SSID, restricting the number of clients that are given the SLA at a particular point in time and on particular radios in an AP (if too many roaming devices are given the SLA at a point in time resources may run out and all clients will not meet the SLA, and the VN would decline the SLA offer in this case), or ensuring prioritized radio access (e.g., IEEE 802.11v roaming suggested to least congested radios around the client, roaming suggestion at higher RSSI/data rate levels than other clients, etc.).

Figure 5:
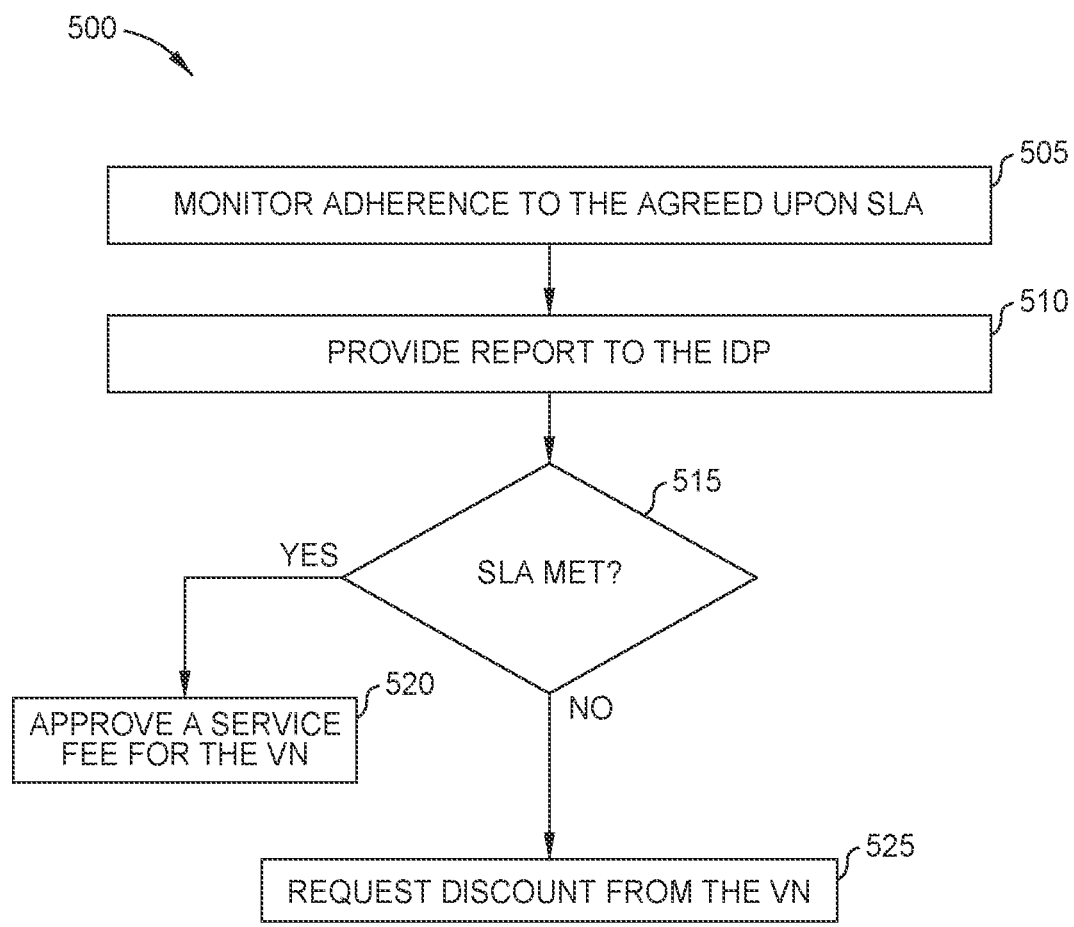
FIG. 5 is a flowchart for monitoring adherence to a negotiated SLA, according to one embodiment described herein.

FIG. 5 is a flowchart of method 500 for monitoring adherence to a negotiated SLA, according to one embodiment described herein. The method 500 assumes that an SLA has already been agreed upon between the VN and the roaming device using either of the methods 200, 400 described in FIGS. 2 and 4. The method 500 provides techniques to ensure that the VN provides the level of service guaranteed by the SLA.

At block 505, the roaming device, or the VN, can monitor adherence to the agreed upon SLA. For example, while attached to the VN, the roaming device can determine whether the VN provides the minimum upload/download speeds indicated in the SLA. On the other hand, the VN can monitor adherence to the SLA by activating telemetry monitoring for the roaming device and measuring how much bandwidth each roaming client is allocated and how much they consume. Adherence can be measured at an AP in the VN as it transmits download traffic to the roaming device, ensuring the roaming device is allocated a certain amount of bandwidth. Alternatively, in the upload direction, when examining results of a buffer status report (BSR) returned by the roaming device a record is made if the bandwidth requested by the roaming device is being provided by the AP in accordance with the SLA. Further, the SLA can follow the roaming device as it roams from AP to AP in the VN. In addition, bandwidth to the Internet may be measured and guaranteed for each roaming device. The Internet gateway router may then participate in this as the VN ensures that bandwidth guarantees are given for the roaming device (not solely focused just on the WLAN bandwidth, but also Internet-facing bandwidth).

Latency may also be measured for the client in accordance with the SLA. While measuring latency across the entire Internet is not possible, the wireless controller or AP can measure the latency from client to Internet gateway and between the gateway and a fixed point on the Internet (such as an Umbrella DNS server, IDP application server or other).

At block 510, the roaming device or the VN provides a report to the IDP regarding the adherence of the VN to the SLA. The report may include the minimum bandwidth or maximum latency measured by the roaming device or the VN over a period of time (e.g., ten minutes). In one embodiment, the roaming device or VN provides the report at predefined intervals.

In one embodiment, the roaming device or the VN provides the report at the end of the device's session. For example, the VN may use the VN and IDP connectors to provide the results of the session (e.g., accounting data) and whether the roaming device was handled in accordance with the SLA, along with total bandwidth consumed, amount of time on the network, etc.

At block 515, the IDP determines whether the SLA was met by evaluating the report. In this example, the IDP pays the VN a set fee depending on whether the VN provided a level of service to the roaming device that satisfied the SLA. If the VN adhered to the SLA, then at block 520, the IDP determines to pay the VN the set price. Further, the IDP may then charge the user of the roaming device (assuming this was not part of a subscription with the DP).

If the SLA was not adhered to, at block 520, the IDP requests a discount from the VN. This discount may vary depending on how much the actual performance differed from the performance guaranteed by the SLA. For example, if the actual download speeds were 15% slower than the minimum download speed in the SLA, the IDP may request a 15% discount in the fee. If the actual download speeds were 20% slower, than the IDP may request a 20%, and so forth. In this manner, the IDP can pay for the roaming device to use the VN in a manner that accurately reflects the ability of the VN to adhere to the agreed upon SLA.

When the SLA can no longer be offered (e.g. the roaming device moves out of range), in one embodiment the VN returns to the IDP an SLA failure message, along with the reason code (e.g. KPI failure) and the accounting data for all monitored KPIs. The IDP can then return a "continue" message if a fallback profile SLA can still be ensured, or a "stop" message otherwise. The VN may also provide this messaging to the user via the roaming device over protected ANQP messaging (the stop/continue then belonging to the device, and the VN forwarding the device decision along with accounting data to the DP).

The following examples are different techniques for applying an SLA to real time and non-real time traffic in a VN wireless network.

Real-time Downlink traffic from the group in the SLA (the AID list) can be aggregated separately from other traffic (i.e. for DL OFDMA purposes) as opposed to being grouped with other user devices. The SLA parameters for the group (such as delay) are set such that the minimum delay requirement is met (e.g. 20 ms). Note that this may also be met if the same aggregation parameters are in effect for the other device (i.e. by adjusting the parameter globally). Before the delay constraint is met, a DL OFDMA MU PPDU can be transmitted by the AP with required RU allocation to deliver the RT traffic for this slice (including other device traffic if RU space allows).

Non-real-time DL traffic from the SLA group (AID list) may be aggregated separately from other traffic (i.e. for DL OFDMA purposes) as opposed to being grouped with other devices. While no strict timing requirement is necessary, a minimum total throughput constraint may be used (e.g. 25 Mb/s) and so the same aggregation logic is applied as above (e.g., form an OFDMA MU PPDU based on user devices in group). To meet the minimum constraint, the VN allocates a min number of RUs in each TXOP for this group based on e.g. a leaky bucket approach where minimum throughput is the token emission interval.

Real-time upload traffic from the SLA group (AID list) may be allocated by first polling the scheduling group for a buffer status report BSR at a frequency compatible with the delay requirement (e.g. 20 ms) and subsequently triggering an UL OFDMA HE MUPPDU with sufficient RUs from the BSR (then deducted from the token bucket).

Non-real-time upload traffic may be allocated by first polling the SLA group for a BSR at a worst-case frequency compatible with the MSDU timeout requirement (e.g. 200 ms) and subsequently triggering an UL OFDMA HE MUPPDU with sufficient RUs from the BSR (then deducted from the token bucket).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   accessing, by a user device, an identity profile provided to the user device by an identity provider (IDP), wherein the identity profile includes a service level agreement (SLA) criterion;
   receiving, at the user device, an advertisement from a visited network (VN) indicating one or more SLAs supported by the VN, wherein the advertisement is received before the user device has associated with the VN, and wherein the IDP and the VN are part of a same identity federation; and
   upon determining one of the one or more SLAs supported by the VN satisfies the SLA criterion, associating, by the user device, with the VN.

2. The method of claim 1, wherein the SLA criterion comprises a minimum bandwidth.

3. The method of claim 2, wherein the SLA criterion is stored in an identity profile in the user device that was received from the IDP, the identity profile further comprising identity information used by the VN to authenticate the user device with the IDP.

4. The method of claim 3, wherein the user device associates to the VN only after the VN has authenticated the user device with the IDP based on the identity information.

5. The method of claim 1, wherein the SLA criterion comprises a maximum latency.

6. The method of claim 1, further comprising, before associating with the VN:
   receiving, at the user device, the SLA criterion from the IDP.

7. The method of claim 1, wherein the VN comprises a Wi-Fi network and the user device is a wireless device.

8. The method of claim 1, further comprising:
   upon determining the one or more SLAs supported by the VN does not satisfy the SLA criterion, outputting at least one of a graphical user interface (GUI) or audio message to a user of the user device, the GUI or audio message indicating differences between the SLA criterion and the one or more SLAs supported by the VN; and
   receiving, after outputting the GUI or audio message, input from the user whether to agree to one of the one or more SLAs supported by the VN in order to associate the user device to the VN.

9. The method of claim 1, further comprising monitoring, by the user device, compliance of the VN with the SLA criterion.

10. The method of claim 1, wherein the identity profile further comprises identity information; the method further comprising
    providing, by the user device, the identity information to the VN for authentication.

11. A non-transitory computer readable medium having program instructions embodied therewith, the program instructions executable by a processor of a user device to perform an operation, the operation comprising:
  accessing, by the user device, an identity profile provided to the user device by an identity provider (IDP), wherein the identity profile includes a service level agreement (SLA) criterion;
  receiving, at the user device, an advertisement from a visited network (VN) indicating one or more SLAs supported by the VN, wherein the advertisement is received before the user device has associated with the VN, and wherein the IDP and the VN are part of a same identity federation; and
  upon determining one of the one or more SLAs supported by the VN satisfies the SLA criterion, associating, by the user device, with the VN.

12. The non-transitory computer readable medium of claim 11, wherein the SLA criterion comprises a minimum bandwidth.

13. The non-transitory computer readable medium of claim 11, wherein the SLA criterion comprises a maximum latency.

14. The non-transitory computer readable medium of claim 11, wherein the operations further comprise, before associating with the VN:
  receiving, at the user device, the SLA criterion from the IDP.

15. The non-transitory computer readable medium of claim 14, wherein the SLA criterion is stored in an identity profile in the user device that was received from the IDP, the identity profile further comprising identity information used by the VN to authenticate the user device with the IDP.

16. The non-transitory computer readable medium of claim 15, wherein the user device associates to the VN only after the VN has authenticated the user device with the IDP based on the identity information.

17. The non-transitory computer readable medium of claim 11, wherein the VN comprises a Wi-Fi network and the user device is a wireless device.

18. The non-transitory computer readable medium of claim 11, wherein the operations further comprise:
  upon determining the one or more SLAs supported by the VN does not satisfy the SLA criterion, outputting at least one of a graphical user interface (GUI) or audio message to a user of the user device, the GUI or audio message indicating differences between the SLA criterion and the one or more SLAs supported by the VN; and
  receiving, after outputting the GUI or audio message, input from the user whether to agree to one of the one or more SLAs supported by the VN in order to associate the user device to the VN.

19. The non-transitory computer readable medium of claim 11, wherein the operations further comprise monitoring, by the user device, compliance of the VN with the SLA criterion.

20. The non-transitory computer readable medium of claim 11, wherein the identity profile further comprises identity information; and wherein the operations further comprise providing, by the user device, the identity information to the VN for authentication.

* * * * *

UNITED STATES PATENT AND TRADEMARK OFFICE
CERTIFICATE OF CORRECTION

| | | |
|---|---|---|
| PATENT NO. | : 12,010,559 B2 | Page 1 of 1 |
| APPLICATION NO. | : 18/187549 | |
| DATED | : June 11, 2024 | |
| INVENTOR(S) | : Malcolm M. Smith et al. | |

It is certified that error appears in the above-identified patent and that said Letters Patent is hereby corrected as shown below:

In the Specification

In Column 1, Line 24, delete "mom Open" and insert -- Open --.

In Column 9, Line 40, delete "DP)." and insert -- IDP). --.

In Column 9, Line 62, delete "DP)." and insert -- IDP). --.

Signed and Sealed this
Twenty-eighth Day of January, 2025

Coke Morgan Stewart
*Acting Director of the United States Patent and Trademark Office*